Patented Sept. 7, 1948

2,448,809

UNITED STATES PATENT OFFICE 2,448,809

PROCESS FOR PREPARING HOMOGENEOUS PARTIALLY CHLORINATED DERIVATIVES OF RUBBER

Carel Koningsberger, Delft, Netherlands, assignor to Rubber Stichting, Amsterdam, Netherlands No Drawing. Application October 1, 1945, Serial No. 619,690. In the Netherlands July 29, 1944

4 Claims. (Cl. 260—772)

The invention relates to a process for preparing homogeneous, partially chlorinated derivatives of rubber.

Up till now chlorinated rubber has been prepared with a chlorine content of 60 to 70% of chlorine. If the chlorine were combined with rubber only by addition, the chlorinated rubber would only contain about 50% of chlorine. It is clear that in the usual chlorinated rubber derivatives with a chlorine content of 60 to 70% of chlorine the chlorine is present partially combined by addition and partially as substituted chlorine. The product is homogeneous, all the basic rubber molecules contain the same number of Cl-atoms and the proportion between substituted and additioned chlorine is always nearly the same, irrespective of the method of preparation of the product. These chlorinated rubber products are in the form of a powder.

In order to obtain pure chlorinated products without by-products such as oxidized rubber and other impurities it has been established by the prior art that only chlorine and sulphuryl chloride can be used as a chlorinating agent. Sulphuryl chloride reacts more slowly and hydrogen chloride and sulphur dioxide are formed as volatile byproducts.

Up until now it has, however, not been possible to prepare homogeneous products with low chlorine contents, using either chlorine or sulphuryl chloride.

It is now the object of the invention to prepare homogeneous chlorinated rubber and that with a chlorine content of less than 50%.

Another object of the invention is to obtain a chlorinated rubber derivative which is in plastic-elastic condition in contradistinction to the known products with more than 50% of chlorine, which are in powder form.

A further object is to obtain a chlorinated rubber wherein the chlorine is combined with the rubber principally by substitution.

Still another object is to prepare rubber derivatives which, when mixed with magnesium oxide, zinc oxide, or the like oxides and then heated are converted into products similar to vulcanized natural rubber and which products are moreover oil proof.

The applicant has according to the invention succeeded in preparing homogeneous chlorinated rubber with a chlorine content of less than 50%, the chlorine being principally combined with the rubber by substitution. This is evident from the fact that immediately when the reaction sets in hydrogen chloride escapes and in drawing up the chlorine balance always about half of the added amount appears to be taken up. This result can only be obtained by chlorinating with sulphuryl chloride, while taking precautionary measures such as cooling so that the reaction between sulphurylchloride and rubber which latter must be present in excess can only begin when the reaction products have been thoroughly mixed. The reaction must then take place at a rather low temperature, e. g. 40 to 60° C. Preferably an inert gas, e. g. nitrogen is passed through the mixture, in order to remove the volatile reaction products more rapidly.

The invention is elucidated below with the aid of some examples. It is, however, evident that the scope of the invention is not limited to the amounts, proportions, temperatures, reaction times, etc. given herein.

*Example I*

20 g. of crepe rubber which has been plasticized for 40 min. on a hot roller are dissolved in 400 cc. of benzene. The mixture is cooled to about 7° C. and 9 cc. (15 g.) of also cooled sulphuryl chloride are added with stirring. The reaction components are thus thoroughly mixed and the mixture is then heated at 40° C., while passing therethrough a slow nitrogen current. At the end of the day the heating is cut off, but the passing of the nitrogen current is continued. The next morning the mixture is heated again, etc. After four days all of the sulphur dioxide and hydrogen chloride formed are removed. The mixture is poured into an excess of methanol and the rubber derivative is thereby coagulated. The product is thoroughly washed with methanol and dried at ordinary temperature under reduced pressure. The chlorine content is 17.5%.

10 g. of the product are introduced into 200 cc. of benzene, the greater part is redissolved. About 10% of the product is insoluble, this part is separated by decantation and freed of the swelling agent. Analysis proves that it contains 16.2% of chlorine (fraction 1). The solution is fractionated by treatment with organic solvents. Fractions are thus separated, containing after purification 16.0, 16.6 and 19.4% of chloride respectively. The average chlorine content of the original sample as calculated from the weights and chlorine contents of the obtained fractions is 17.5%, thus in good accordance of the percentage as analytically stated.

When operating with chlorine in solution the results are as follows:

20 g. of crepe rubber plasticized with heating are dissolved in 400 cc. of tetrachloromethane and a solution of 10 g. of chlorine in 88.5 cc. of tetrachloromethane is added at room temperature under vigorous stirring. The rubber derivative formed is coagulated in an excess of methanol and washed thoroughly therewith. The dried product contains 17.7% of chlorine.

By fractionation of the product as described above three fractions are obtained with a chlorine content of 2.1, 26.8 and 34.9% respectively. The dispersion of these numbers is considerable and indicates that it is impossible to obtain chlorinated rubber derivatives which are in the least degree homogeneous using chlorine according to this method.

Similar results are obtained when passing gaseous chlorine through a rubber solution, wherein an excess of rubber is provided.

*Example II*

(a) A solution of 20 g. of crepe rubber (plasticized with heating for 40 min.) in 400 cc. of benzene is mixed below 10° C. with 18 cc. (30 g.) of sulphuryl chloride. The mixture is then heated for 7 hours at 60° C. while stirring and passing therethrough a moderate nitrogen current. The passing through is then continued for 40 hours at room temperature. The rubber derivative is isolated by coagulation and thorough washing with methanol. After drying a product is obtained containing 28.1% of chlorine.

(b) The same operation is repeated with a second quantity of 20 g. of crepe rubber plasticized in the heat for 40 min. A reaction product is obtained with 27.9% of chlorine.

These examples show the degree of reproducibility of this method of operation.

*Example III*

10 g. of sheet rubber, which has been plasticized for 10 min. on a hot roller are dissolved in 200 cc. of benzene. The mixture is cooled in iced water to 6–7° C. and 6 cc. (10 g.) of equally cooled sulphuryl chloride are then added dropwise with stirring. The reaction components are thus thoroughly mixed and the mixture heated on a waterbath to a temperature of 40–60° C. with continuous stirring and passing through of a slow nitrogen current. A distinctly perceptible development of gas ($SO_2$ and HCl) occurs. The mixture is left to react for 3 hours at this temperature and the benzene and the sulphuryl chloride, sulphur dioxide and hydrogen chloride which may still be present are then expelled under reduced pressure at a bath temperature of about 40° C. A plastic-elastic rubbery homogeneous product is obtained, the appearance of which shows little difference from the starting material but contains 23.6% of chlorine and less than 0.1% of sulphur. From the latter fact it appears that the sulphuryl chloride has acted almost exclusively as a chlorination agent. When calculating how much of the chlorine added (as $SO_2Cl_2$) is taken up by the rubber, this appears to be 57%, which proves that by far the greater part of the halogen must be introduced into the rubber by substitution.

*Example IV*

A chlorine containing rubber derivative is produced according to Example III from 10 g. of sheet rubber plasticized in the heat and 1.5 cc. (2.5 g.) of sulphuryl chloride.

The product formed, which contains 5.3% of chlorine is a plastic-elastic predominantly plastic and somewhat sticky material. The yield of the reaction calculated on the added chlorine is 43%, so that also in this case substitution must have taken place predominantly.

*Example V*

A chlorinated product is prepared according to the process described in Example III from 10 g. of sheet rubber and 18 cc. (30 g.) of sulphuryl chloride. After drying the reaction mixture by evaporation a hard horny product is obtained containing 42.2% of chlorine. The yield of the reaction calculated on the added chlorine is 46%, in other words the chlorine is predominantly taken up by substitution.

The chlorinated rubber obtained by the present process can be plastic-elastic or horny. Such a chlorinated rubber product with 20–30% of chlorine turns out an elastic product by mixing with magnesium oxide, zinc oxide or the like and heating. This product can be compared with a natural vulcanized rubber but is moreover oil-proof.

*Example VI*

100 parts by weight of chlorinated rubber, 20 parts by weight of magnesium oxide and 5 parts by weight of colophony are heated for 15 min. at 100° C. The product obtained has a tensile strength of 76 kg. per cm.$^2$ and an extension at rupture (elongation) of 540%. The swelling in hexane is of the rate of the swelling of neoprene. By the addition of black the tensile strength can be improved.

Having thus described my invention, I desire to secure by Letters Patent and claim:

1. A process for preparing homogeneous, partially chlorinated derivatives of hydrocarbon rubbers, selected from a class consisting of natural rubber, balata and gutta percha, said derivatives containing from about 5 to 50% of chlorine, which comprises mixing a solution of such a hydrocarbon rubber with sulphuryl chloride while maintaining the temperature below about 10° C. so that no substantial reaction takes place and thereafter heating the mixture to reaction temperatures of the order of 40° to 60° C. until the reaction is substantially completed.

2. The process of claim 1 wherein an inert gas is passed through the reaction mixture during the reaction.

3. A process for preparing homogeneous, partially chlorinated derivatives of hydrocarbon rubbers, selected from a class consisting of natural rubber, balata and gutta percha, said derivatives containing from about 5 to 50 percent of chlorine, which comprises mixing a solution of such a hydrocarbon rubber with sulphuryl chloride while maintaining the temperature below about 10° C. so that no substantial reaction takes place, thereafter heating the mixture to reaction temperatures of the order of 40° to 60° C. until the reaction is substantially completed, recovering the resulting chlorinated rubber and mixing it with a metal oxide selected from a class consisting of magnesium oxide and zinc oxide while heating the mixture.

4. The process of claim 3 wherein an inert gas is passed through the mixture of rubber solution and sulphuryl chloride during the chlorinating reaction.

CAREL KONINGSBERGER.

REFERENCES CITED

The following references are of record in the file of this patent:

UNITED STATES PATENTS

| Number | Name | Date |
|---|---|---|
| 2,170,947 | Habgood et al. | Aug. 29, 1939 |

FOREIGN PATENTS

| Number | Country | Date |
|---|---|---|
| 121,091 | Great Britain | Dec. 5, 1918 |